United States Patent [19]

Kurzhals et al.

[11] 4,207,352

[45] Jun. 10, 1980

[54] PROCESS FOR THE DECAFFEINATION OF RAW COFFEE BEANS

[75] Inventors: Hans-Albert Kurzhals, Hambergen-Heibenbüttel; Klaus F. Sylla, Bremen, both of Fed. Rep. of Germany

[73] Assignee: decofa Kaffee-Bearbeitungs-GmbH, Fabrikenufer, Bremen, Fed. Rep. of Germany

[21] Appl. No.: 902,005

[22] Filed: May 1, 1978

[30] Foreign Application Priority Data

May 5, 1977 [DE] Fed. Rep. of Germany ....... 2720203

[51] Int. Cl.² ............................................... A23F 1/10
[52] U.S. Cl. ..................................... 426/428; 426/595
[58] Field of Search ...................... 426/595, 430, 428

[56] References Cited

U.S. PATENT DOCUMENTS

| 953,643 | 3/1910 | Seisser | 426/428 |
|---|---|---|---|
| 1,629,512 | 5/1927 | Kundig | 426/428 |
| 1,742,261 | 1/1930 | Klein | 426/428 X |
| 2,016,634 | 10/1935 | Grethe | 426/428 X |
| 4,087,562 | 5/1978 | Jones et al. | 426/428 |

FOREIGN PATENT DOCUMENTS

| 247039 | 2/1926 | United Kingdom | 426/428 |
|---|---|---|---|
| 366305 | 2/1932 | United Kingdom | 426/428 |

*Primary Examiner*—Joseph M. Golian
*Attorney, Agent, or Firm*—Pollock, Vande Sande & Priddy

[57] ABSTRACT

A process for the decaffeination of raw coffee beans. Coffee beans containing 15 to 55 percent water are treated with the ester of an organic acid, in combination with a ketone.

17 Claims, No Drawings

PROCESS FOR THE DECAFFEINATION OF RAW COFFEE BEANS

The present invention relates to a process for the decaffeination of raw coffee beans.

BACKGROUND OF THE INVENTION

It is known to first open raw coffee beans by means of water or steam and then to extract the caffeine by means of an organic solvent. If the extraction is effected by means of a hydrocarbon halide, such as methylene chloride or trichloroethylene, the solvent must be removed as completely as possible, leaving only very small amounts of solvent which, according to the present state of medical knowledge, are harmless.

If acetic acid esters, for example, acetic acid ethyl ester (Cf., e.g., German Pat. No. 588,644), are used for the extraction, the roasted coffee produced from raw coffee beans decaffeinated according to this process has an aftertaste which cannot be removed even by intensive steaming of the decaffeinated raw coffee beans.

If ketones are used for the decaffeination (Cf., e.g., Swiss Pat. No. 100,167 and U.S. Pat. No. 1,629,512), the coffee beans have spots after being roasted. The content of water-soluble substances in the raw beans is reduced in an undesirable manner. Furthermore, particularly the low-boiling ketones (acetone, butanone-2) effect an extraction of water from the beans whereby the time required for decaffeination is considerably increased. Additionally, the taste of the roasted coffee differs from that of an untreated roasted coffee.

BRIEF SUMMARY OF THE INVENTION

It is the object of the invention to provide a process for the decaffeination of raw coffee beans by treating raw coffee beans, opened by means of water, with the ester of an organic acid, which process avoids the disadvantages described above. This object is achieved by using the ester in combination with a ketone.

Surprisingly, the roasted coffee infusion prepared from raw coffee beans decaffeinated in accordance with the invention has no unpleasant aftertaste, and its taste does not differ from that of untreated roasted coffee.

DESCRIPTION OF A PREFERRED EMBODIMENT

The esters used are preferably those which are harmless from the point of view of health, particularly esters which occur naturally in raw coffee or in roasted coffee. Esters with a low boiling point are suitable, particularly those with boiling points below about 100° C. at normal pressure. Particularly preferred are esters of low-molecular alkanic acids, such as $C_1$ to $C_5$ carbonic acids, of low-molecular alkanols, such as $C_1$ to $C_3$ alkanols. Examples include formic acid methyl esters, ethyl esters and propyl esters, acetic acid methyl esters, ethyl esters and propyl esters, propionic acid ethyl esters and butyric acid methyl esters. Particularly preference is given to the methyl ester and ethyl ester of the acetic acid. Mixtures of esters may also be used.

The ester used should have a good solubility for caffeine. It is also an advantage if the ester does not dissolve any substances other than caffeine under the conditions of the process, i.e., it should have a high selectivity for caffeine. Depending on the solubility of the ester for caffeine, the weight ratio of ester to dry raw coffee is between 0.5:1 and 50:1, preferably between 2 to 15:1.

Ketones harmless from the point of view of health are preferred for the process according to the invention, particularly ketones which occur naturally in raw coffee or roasted coffee. Low-boiling ketones, particularly with boiling points below 100° C., are suitable. It is also advantageous for the ketone to have the same boiling curve as the ester with which the ketone is used. Suitable ketones are those with 3 to 6 carbon atoms, such as acetone, butanone-2, pentanone-2, pentanone-3 and methyl isopropyl ketone. If a particular ester requires comparatively high ketone concentrations, then the ketone should preferably have solubility for caffeine. Mixtures of ketones may also be used.

The preferred weight ratio of ester to ketone is 99.95 to 50 parts by weight of ester: 0.05 to 50 parts by weight of ketone. Preferred ranges are, for:

acetic acid methyl ester: acetone 85:15 to 97:3
acetic acid methyl ester: butanone-2 75:25 to 90:10
acetic acid ethyl ester: acetone 65:35 to 93:7
acetic acid ethyl ester: butanone-2 50:50 to 80:20

Preferably, the ketone concentration in the solvent combination is rather low. However, it must be high enough so that the object of the process according to the invention is achieved, i.e., decaffeination resulting in roasted coffee without aftertaste and roasted beans without spots.

Beans used for the process according to the invention have a water content of 15 to 55, and preferably 25 to 45 percent by weight, with reference to dry raw coffee. For this purpose, the raw coffee beans are treated in the usual manner with liquid water or steam. The individually selected water content is dependent on the composition of the solvent combination used and on the duration and kind of extraction process.

The extraction of the water-containing raw coffee beans is effected in the customary manner, in accordance with any known processes of solid-liquid extraction. The operation can be either continuous or discontinuous.

To prevent changes in the water content of the opened raw coffee beans during extraction and consequent interference with the decaffeination process, small amounts of water can, if necessary, be added to the ester-ketone combination. Preferably, the water content in the solvent mixture amounts to 1 to 10 percent by weight, with respect to the solvent mixture, in particular enough water is added to produce a dynamic equilibrium between the water content of the raw coffee beans and that of the solvent mixture.

The preferred extraction temperature is between about 20 and 120° C., especially 60 to 85° C. The pressure is so selected that the solvent mixture does not boil at the selected extraction temperature. The duration of extraction is kept as short as possible.

The weight ratio of the solvent to the raw coffee should, on the one hand, be high enough to keep the duration of extraction as short as possible. On the other hand, uneconomically large amounts of solvent are to be avoided.

The preferred weight ratio of solvent to dry raw coffee beans is 1:1 to 100:1, particularly 4:1 to 30:1. Dry raw coffee beans are to be understood, in this context, as beans with their natural moisture content.

After termination of the process according to the invention, the solvent is separated from the raw coffee. This can be effected in the usual way by heating, vacuum evaporation, mechanical separation, steaming with saturated steam or superheated steam, or by adding liquid water and subsequent addition of heat in the vacuum. If the extraction has been effected with a solvent mixture the components of which occur naturally in the raw coffee or in the roasted coffee, the solvent need be removed only to the extent that, after roasting, the amounts of solvent present in the coffee are no larger than those in untreated roasted coffee.

After removal of the solvent, the raw coffee is dried in the known manner. The beans decaffeinated by the process according to the invention and subsequently roasted have no aftertaste and no spots. The utilized solvent can, to a large extent, be recovered.

With a suitable composition of the solvent mixture utilized in accordance with the invention, substances other than caffeine which contribute to the presence of undesired stimulants in roasted coffee can also be removed from the raw coffee beans. Such undesired stimulants normally produced during roasting reduce the digestibility of the coffee beverage. As indicator for the successful removal of such constituents which, after roasting, contribute to the presence of undesired stimulants, carbonic acid-5-hydroxy-tryptamide (C-5-HT) can be mentioned (J. Wurziger, 5th ASIC-Colloquium, Lisbon, 1971 "Carbonic acid-hydroxy-tryptamide for the evaluation of fresh and treated coffee"). By means of the process according to the invention, and suitable selection of the components of the solvent mixture, the content of constituents contributing to the presence of undesired stimulants after roasting can be considerably reduced, so that the coffee produced by the process according to the invention is not only caffeine-free but also low in undesired stimulants.

EXAMPLE 1

500 g raw coffee, consisting of a mixture of different "Arabicas", were humidified in a rotating container with 130 g water at 70° C. The water content of the opened raw coffee beans then amounted to 28.5 percent by weight. Extraction was effected in the rotating container with 1000 ml of a mixture consisting of 68 percent by weight ethyl acetate, 30 percent by weight butanone-2 and 2 percent by weight water per solvent charge at a temperature of 70° C. The solvent charge was first changed after 3 hours and then every hour. The entire extraction period was 10 hours. The weight ratio of the total solvent used to the dry raw coffee was 14.0:1. After extraction, the raw coffee was steamed for 10 hours in the rotating container at 95° C. under vacuum. Before starting the steaming, 50 ml water were added to the decaffeinated raw coffee and the container was then placed under vacuum. The amount of condensate removed by evaporation was then discontinuously replaced, at intervals of 30 minutes, by water. After steaming, the beans were dried in the rotating container under vacuum at a temperature of 80° C. Analysis of the dried, decaffeinated raw coffee beans showed a caffeine content of 0.072 percent by weight, with reference to the dry weight, and a degree of decaffeination of 93.5%. The remaining solvent content of the raw coffee beans amounted to 26 ppm as the sum of ethyl acetate and butanone-2. No increased content of ethyl acetate and butanone-2 was found in the roasted coffee. The infusion of the roasted coffee had no determinable aftertaste. As total dry substance, 12.71 g were determined in the utilized solvent mixture, 4.65 g being caffeine, the remainder non-caffeine substances.

EXAMPLE 2

22 kg raw coffee, consisting of a mixture of different "Arabicas", were humidified for two hours in a water-cooled rotating drum with saturated steam at a temperature of 80° C. The water content of the opened raw coffee then amounted to 40.0 percent by weight. The humid raw coffee beans were placed into an extractor and extracted therein for 9.5 hours at a temperature of 80° C. and a pressure of 1.7 bar. The solvent mixture consisted of 85.0 percent by volume ethyl acetate and 15.0 percent by volume acetone. The first change in solvent was effected after 3.5 hours, all subsequent changes at intervals of 1.5 hours. The weight ratio of the total solvent used to the dry raw coffee amounted to 8.0:1. After extraction, the extractor was placed under a vacuum with 35 torr absolute pressure for one hour at a temperature of 80° C. in order to remove solvent residue adhering to the surface of the coffee. Steaming was effected in a heated rotating drum at 80° C. with vacuum steam, for a period of ten hours. Subsequently, the raw coffee was dried for five hours in a vacuum drier at 80° C. to a final humidity of 7.2 percent by weight. The decaffeinated raw coffee beans had a caffeine content of 0.054 percent by weight, with reference to the dry weight, and the degree of decaffeination of 95.5%. The residual content of solvent of the raw coffee beans was below 10 ppm acetone and below 10 ppm ethyl acetate. The content of the raw coffee of water-soluble substances was reduced during decaffeination from 28.4 percent by weight, to 25.6 percent by weight, with reference to the dry weight. The roasted, decaffeinated coffee showed no increased acetone and ethyl acetate content. Experts could not detect any aftertaste in the infusion of the roasted, decaffeinated coffee in a cup.

EXAMPLE 3

40 kg raw coffee, consisting of a mixture of different "Arabicas", were opened with a mixture of 68.2 percent by weight methyl acetate, 3.8 percent by weight acetone and 28 percent by weight water. The extraction was effected in the same apparatus at a temperature of 60° C. and a pressure of 1.4 bar. The total extraction period lasted for 13 hours. The solvent mixture consisted of 90.9 percent by weight methyl acetate, 5.0 percent by weight acetone and 4.1 percent by weight water. The weight ratio of the total solvent used, including water, to the raw coffee amounted to 6.25:1. After extraction, the raw coffee was steamed for five hours with saturated steam at a temperature of 105° C. Drying was effected in a vacuum drum drier at 70° C. to a final humidity of 10.2 percent by weight. As the final caffeine content of the raw coffee beans, a value of 0.052 percent by weight, with reference to the dry weight, was achieved from an initial caffeine content of 1.05 percent by weight, with reference to the dry weight. During decaffeination, a total loss in dry substance of 2.3 percent in weight, with reference to the dry raw coffee weight, occurred. The residual content of solvent of the decaffeinated raw coffee amounted to less than 10 ppm acetone and less than 10 ppm methyl acetate. The C-5-HT content of the raw coffee was reduced during decaffeination from 680 ppm to less than 100 ppm. The roasted decaffeinated coffee showed no noticeable differences in its acetone and methyl acetate contents. Experts adjudged the infusion of the roasted decaffeinated coffee to be particularly delicious and free of aftertaste.

What is claimed is:

1. Process for the decaffeination of raw coffee beans, comprising treating raw coffee beans containing 15 to 55 percent by weight water with the ester of low-molecular weight alkanoic acid containing 1 to 5 carbon atoms with a $C_1$–$C_3$ alkanol in combination with a ketone having 3 to 6 carbon atoms and a boiling point below 100° C; wherein the concentration of the ketone based upon the total of the ester and ketone is 0.05 to 50 percent by weight; wherein the weight ratio of the ester-ketone combination to the raw coffee beans is 1:1 to 100:1; and separating ester and ketone from the coffee beans to at least the extent that the amount of ester and ketone remaining in the treated coffee after roasting are no greater than that in untreated roasted coffee.

2. The process of claim 1, wherein said acid is selected from the group consisting of formic acid, acetic acid, propionic acid, butyric acid, and mixtures thereof.

3. The process of claim 1, wherein said ester is selected from the group consisting of methyl formate, ethyl formate, propyl formate, methyl acetate, ethyl acetate, propyl acetate, methyl propionate, ethyl propionate, methyl butyrate, and mixtures thereof.

4. The process of claim 1, wherein said ester is selected from a group consisting of methyl acetate, ethyl acetate, and mixtures thereof.

5. The process of claim 1, wherein said ketone is selected from the group consisting of acetone, butanone-2, pentanone-2, pentanone-3, methyl isopropyl ketone, and mixtures thereof.

6. The process of claim 1, wherein said ester is selected from the group consisting of methyl acetate, ethyl acetate, and mixtures thereof and wherein said ketone is selected from a group consisting of acetone, butanone-2, and mixtures thereof.

7. The process of claim 1, wherein said ester is methyl acetate, said ketone is acetone and the amount of ketone based upon to total of ester and ketone is 3 to 15 percent by weight.

8. The process of claim 1, wherein said ester is methyl acetate, said ketone is butanone-2, and wherein the amount of ketone based upon the total of said ketone and said ester is 10 to 25 percent by weight.

9. The process of claim 1, wherein said ester is ethyl acetate, said ketone is acetone, and wherein the amount of said ketone based upon the total of said ketone and said ester is 7 to 35 percent by weight.

10. The process of claim 1, wherein said ester is ethyl acetate, said ketone is butanone-2 and wherein the amount of said ketone based upon the total of said ketone and said ester is 20 to 50 percent by weight.

11. The process of claim 1, wherein the weight ratio of the ester to the raw coffee beans is between 0.5:1 and 50:1.

12. The process of claim 1, wherein the weight ratio of ester to the raw coffee beans is between 2:1 and 15:1.

13. The process of claim 1, wherein the raw coffee beans contain 25 to 45% by weight water.

14. The process of claim 1, wherein the combination of ester and ketone also contains 1 to 10 percent by weight of water.

15. The process of claim 1, wherein said treating is carried in the temperature range of between about 20° and 120° C.

16. The process of claim 1, wherein said treating is carried out at a temperature in the range of 60°–85° C.

17. The process of claim 1, wherein the weight ratio of the ester-ketone combination is 4:1 to 30:1.

* * * * *